(12) United States Patent
Lee et al.

(10) Patent No.: US 10,082,385 B2
(45) Date of Patent: Sep. 25, 2018

(54) SYSTEM FOR MEASURING DISPLACEMENT OF ACCELERATING TUBE IN HIGH-VACUUM CHAMBER BY USING MICRO-ALIGNMENT TELESCOPE AND METHOD THEREOF

(71) Applicant: INSTITUTE FOR BASIC SCIENCE, Daejeon (KR)

(72) Inventors: Min-Ki Lee, Cheongju-si (KR); Young-Kwon Kim, Daejeon (KR); Yong-Woo Jo, Cheongju-si (KR); Jong-Wan Choi, Daejeon (KR); Woo-Kang Kim, Daejeon (KR); Hee-Tae Kim, Yongin-si (KR)

(73) Assignee: Institute for Basic Science, Daejeon (KR)

( * ) Notice: Subject to any disclaimer, the term of this patent is extended or adjusted under 35 U.S.C. 154(b) by 295 days.

(21) Appl. No.: 15/160,871

(22) Filed: May 20, 2016

(65) Prior Publication Data

US 2017/0167851 A1    Jun. 15, 2017

(30) Foreign Application Priority Data

Dec. 14, 2015    (KR) .......................... 10-2015-0178387

(51) Int. Cl.
*G01B 11/27* (2006.01)
*G01B 11/02* (2006.01)
(Continued)

(52) U.S. Cl.
CPC .......... *G01B 11/028* (2013.01); *G01B 11/002* (2013.01); *G01B 11/272* (2013.01);
(Continued)

(58) Field of Classification Search
CPC .............................. G01B 11/27; G01B 11/028
See application file for complete search history.

(56) References Cited

U.S. PATENT DOCUMENTS

2007/0273464 A1   11/2007   Kitahara et al.
2009/0216476 A1   8/2009    Hofmann et al.

FOREIGN PATENT DOCUMENTS

JP    H06-273432    9/1994
JP    6-300587      10/1994
(Continued)

OTHER PUBLICATIONS

JPO Office Action dated May 9, 2017 of the corresponding counterpart Japanese Patent Application No. 2016-094068 (11 pages), noting listed references in this IDS.

(Continued)

*Primary Examiner* — Tri Ton
*Assistant Examiner* — Rebecca C Bryant
(74) *Attorney, Agent, or Firm* — Lewis Roca Rothgerber Christie LLP

(57) ABSTRACT

A system for measuring displacement of an accelerating tube by using a micro-alignment telescope, which includes a vacuum chamber; a hollow accelerating tube in the vacuum chamber; a sighting target attached to a surface of the accelerating tube while protruding from the surface of the accelerating tube; the micro-alignment telescope spaced apart from one side surface of the vacuum chamber; a first lens device interposed between the micro-alignment telescope and the vacuum chamber; and a second lens device spaced apart from an opposite side surface of the vacuum chamber by a distance, wherein the vacuum chamber includes first and second viewports placed on the surfaces of the vacuum chamber in correspondence with each other, and the micro-alignment telescope, the first lens device, the first viewport, the sighting target, the second viewport and the second lens device are aligned on a same axis in one direction.

5 Claims, 4 Drawing Sheets

(51) Int. Cl.
G01B 11/00 (2006.01)
H05H 5/03 (2006.01)
H05H 7/00 (2006.01)
(52) U.S. Cl.
CPC .............. H05H 5/03 (2013.01); H05H 7/00 (2013.01); *G01B 11/27* (2013.01); *H05H 2007/008* (2013.01)

(56) References Cited

FOREIGN PATENT DOCUMENTS

| | | |
|---|---|---|
| JP | 2000-208300 | 7/2000 |
| JP | 2001-223100 | 8/2001 |
| JP | 2003-46614 | 2/2003 |
| JP | 2008-157955 | 7/2008 |
| KR | 10-2015-0106978 | 9/2015 |
| KR | 10-2015-0122833 | 11/2015 |

OTHER PUBLICATIONS

Shinoe, Kenji, "Measurement of the Cavity Displacement at the Time of Cooling of cERL Main Module", proceedings of the 10$^{th}$ Annual Meeting of Particle Accelerator Society of Japan, Aug. 4, 2013, pp. 950-952.
Beunard, R, "Survey and Alignment Concept for Installation of the Spiral2 Accelerator Devices at Ganil", 10$^{th}$ International Workshop on Accelerator Alignment, Feb. 11, 2008, 6 pgs.
Japanese Notice of Allowance dated Feb. 6, 2018, with English translation, of the corresponding Japanese Patent Application No. 2016-094058, noting listed references in this IDS (8 pages).
KIPO Notice of Allowance, with English translation, dated Oct. 20, 2017 of the corresponding Korean Patent Application No. 10-2015-0178387, noting listed references in this IDS (4 pages).

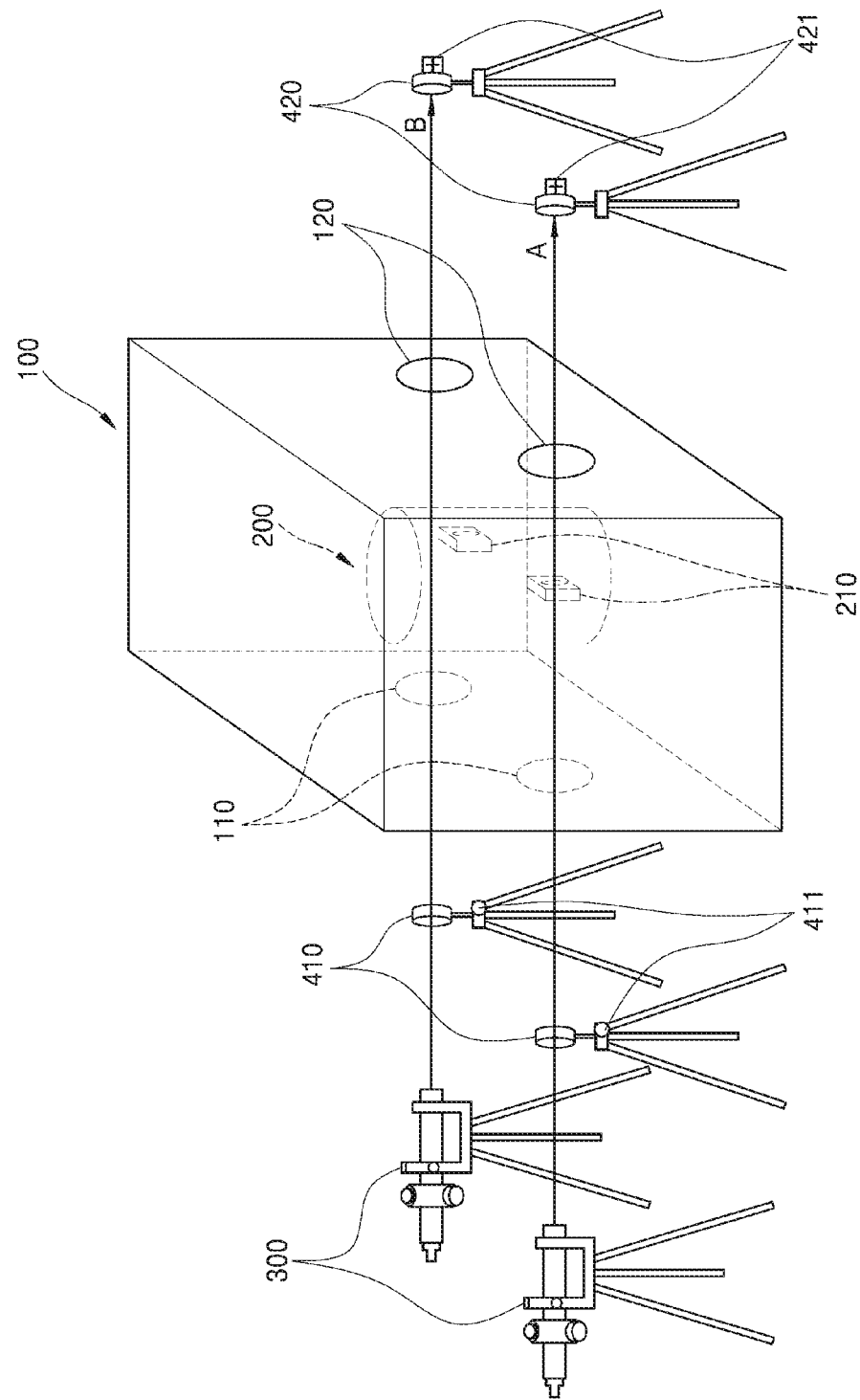
[FIG. 1]

[Fig. 2]
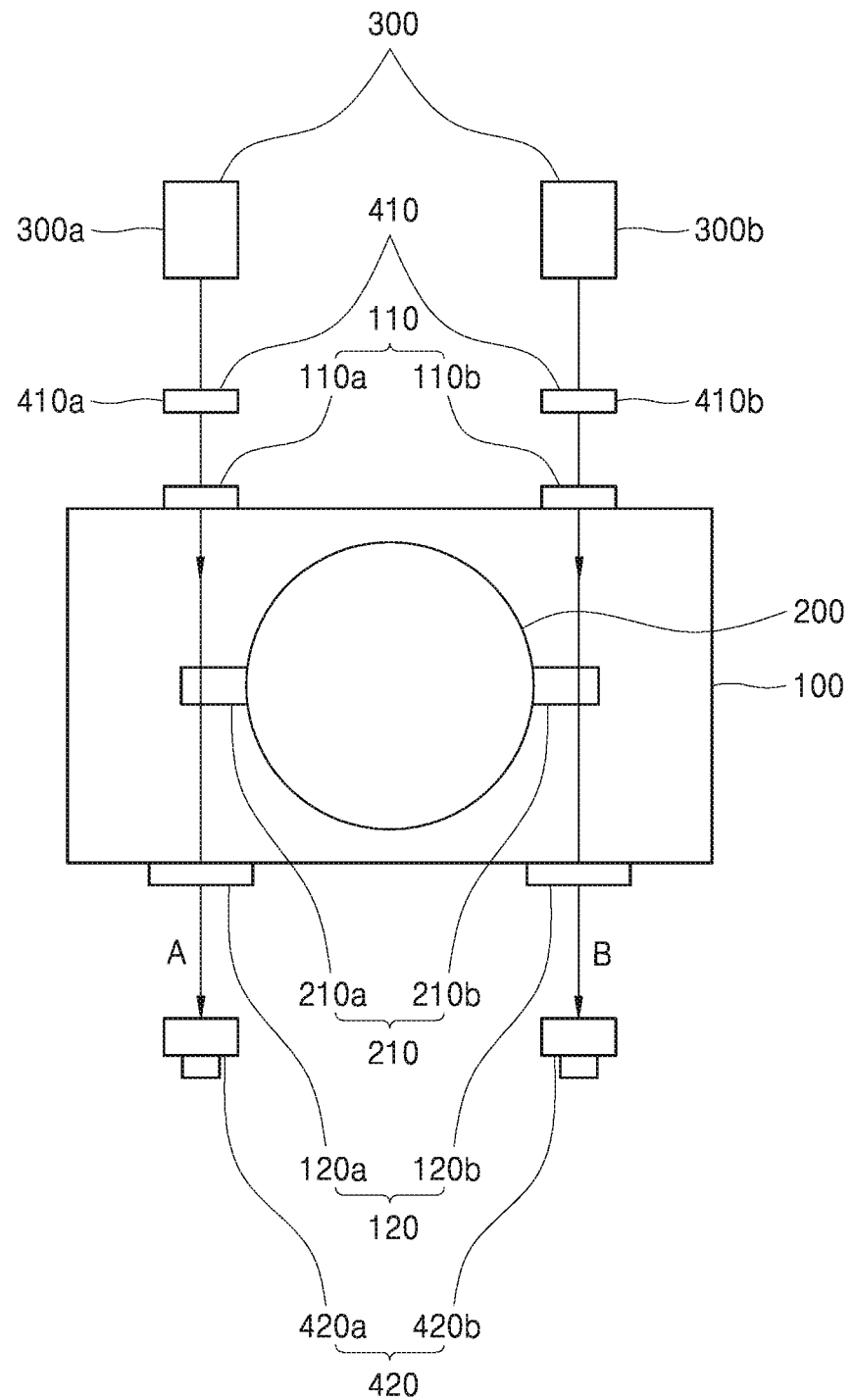

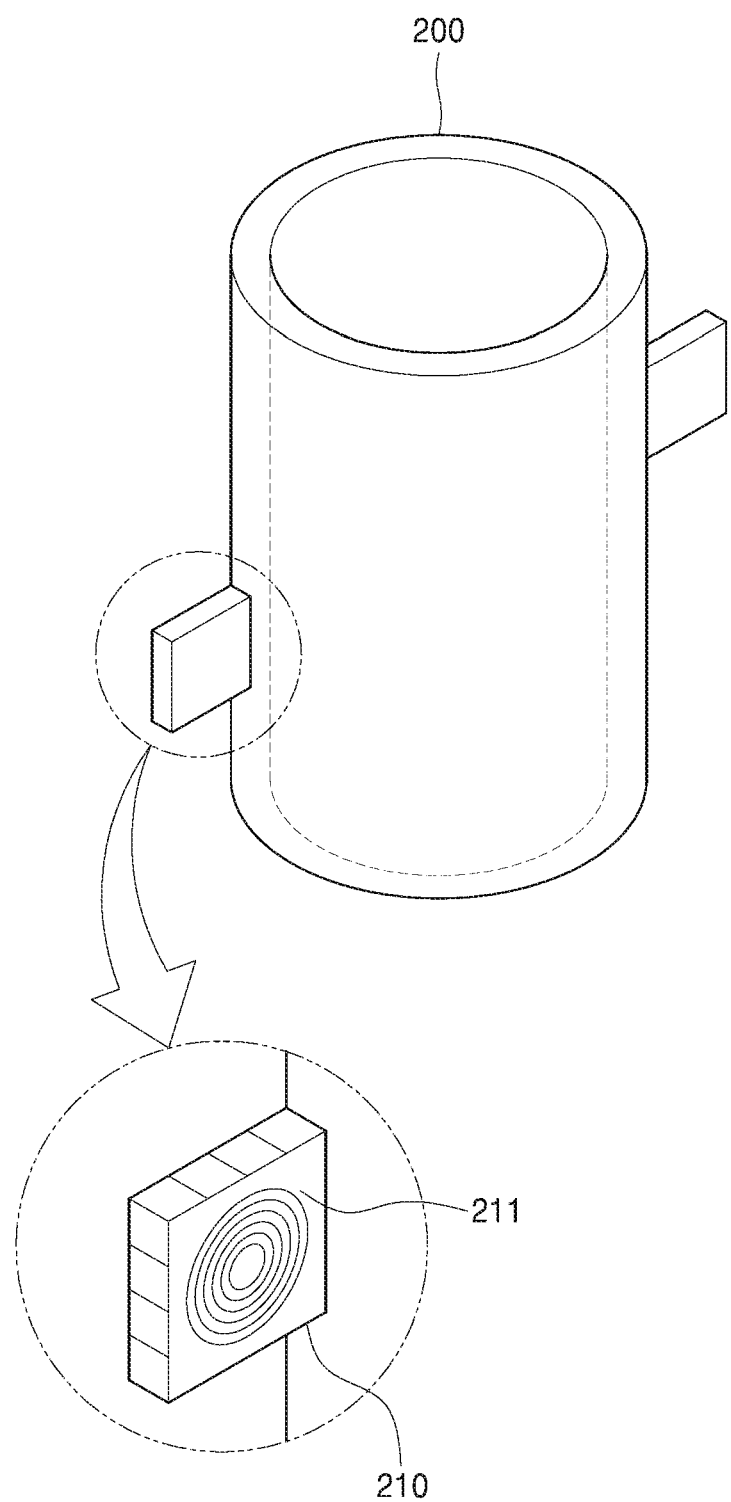
[Fig. 3]

[Fig. 4]
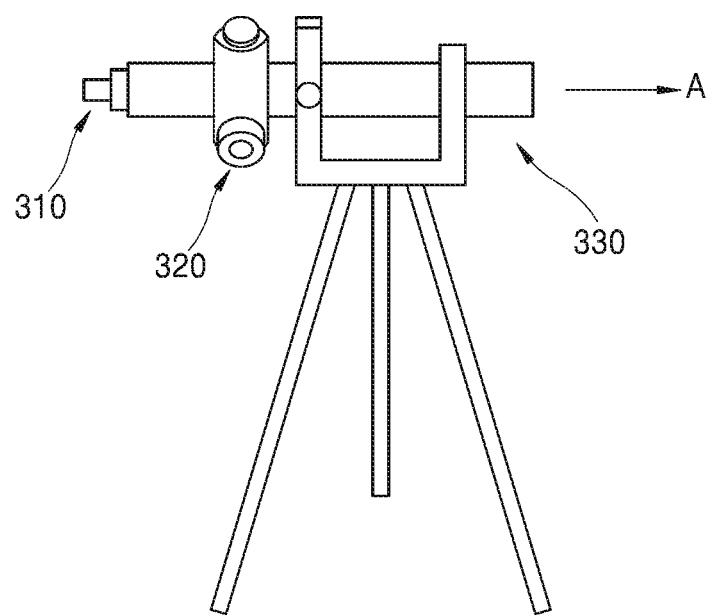

SYSTEM FOR MEASURING DISPLACEMENT OF ACCELERATING TUBE IN HIGH-VACUUM CHAMBER BY USING MICRO-ALIGNMENT TELESCOPE AND METHOD THEREOF

CROSS-REFERENCE TO RELATED APPLICATION

This application claims priority to Korean Patent Application No. 10-2015-0178387 filed on Dec. 14, 2015, and all the benefits accruing therefrom under 35 U.S.C.§ 119, the contents of which is incorporated by reference in its entirety.

BACKGROUND OF THE INVENTION

1. Field of the Invention

The present invention relates to a system for measuring displacement of an accelerating tube in a high-vacuum chamber and a method thereof, and more particularly to a system which includes a micro-alignment telescope to effectively measure the displacement of an accelerating tube installed in a high-vacuum chamber, and a method thereof.

2. Description of the Related Art

An accelerator, which accelerates electrons, protons and charged particles in a high energy state (for example, high energy state from several million electron volts to several trillion electron volts), is classified into various types.

Recently, technical development of a heavy ion accelerator, which is an apparatus for accelerating atom's ions excluding lepton particles such as proton or helium, has been widely performed. In particular, to manufacture a superconductive acceleration tube which is a core component of the heavy ion accelerator, a design technique optimized by analyzing all phenomena electromagnetically, thermally and mechanically and so on, as well as a technique of manufacturing a figure at an error rate of 50 μm or less, a processing capability, and an ultraprecision welding technique is needed.

The accelerating tube manufactured through precision technology, through which particles pass while being accelerated, may give the maximum performance in vacuum when the accelerating tube is installed in a set position. When a vacuum chamber kept in high vacuum, a wall surface of the chamber contracts inwardly and is deformed. Therefore, the accelerating tube that is precisely installed in the vacuum chamber in the atmosphere, moves out of the correct position as the chamber contracts, so that the performance of the accelerating tube decreases. Thus, there is a need to precisely measure the position of the accelerating tube in vacuum in order to improve the performance of the accelerating tube.

As methods of measuring the deformation of an inner component of a vacuum chamber known until the present, there is a method of inferring inner deformation by measuring the outer deformation of a vacuum chamber, and a method of directly measuring a subject by installing various kinds of measuring instruments inside a vacuum chamber.

However, since a chamber is deformed due to vacuum, the reliability of a measured value from these methods cannot be high. In addition, when the inner temperature of a chamber is high or harmful materials are introduced into in the chamber, the various kinds of meters may be out of order or contaminated, so that there is a limitation to use measuring instruments in the chamber.

Therefore, there is a need for a measurement system which is capable of precisely measuring a position error of an accelerating tube caused due to the deformation of a vacuum chamber and correcting it and which is usable without regard to the inner environment of the vacuum chamber and a method thereof.

As patent documents for related arts, there are Korean Unexamined Patent Publication No. 2015-0106978, Japanese Unexamined Patent Publication No. 1994-300587 and US Patent Application Publication No. 2009-0216476.

SUMMARY OF THE INVENTION

An object of the present invention is to provide a system and a method for measuring displacement of an accelerating tube in a high-vacuum chamber, which is capable of precisely measuring and correcting a position error of the accelerating tube caused due to the deformation of a vacuum chamber of an accelerator and is usable even when the inner temperature of the vacuum chamber is high or harmful materials fill the vacuum chamber.

The objects of the present invention are not limited to the above-mentioned object, and other objects will be clearly understood from the following description by those skilled in the art.

In order to accomplish the above object, according to one aspect of the present invention, a system of measuring displacement of an accelerating tube by using a micro-alignment telescope is provided, which includes a vacuum chamber inside which a vacuum state can be formed; a hollow accelerating tube placed in the vacuum chamber; a sighting target attached to a surface of the accelerating tube while protruding from the surface of the accelerating tube; the micro-alignment telescope spaced apart from side surface of the vacuum chamber by a predetermined distance; a first lens device interposed between the micro-alignment telescope and the vacuum chamber; and a second lens device spaced apart from an opposite side surface of the vacuum chamber by a predetermined distance, wherein the vacuum chamber includes first and second viewports placed on the one side surface and the opposite surface of the vacuum chamber in correspondence with each other, and the micro-alignment telescope, the first lens device, the first viewport, the sighting target, the second viewport and the second lens device are aligned on a same axis in one direction.

According to another aspect of the present invention, there is provided a method of measuring displacement of an accelerating tube by using a micro-alignment telescope, in a system for measuring the displacement of the accelerating tube including a vacuum chamber, the micro-alignment telescope, first and second lens devices, a sighting target, and first and second viewports. The method includes adjusting the micro-alignment telescope to be levelled with a ground; aligning the micro-alignment telescope, the first and second lens devices, the sighting target and the first and second viewports in a row along an optical axis formed by a light source included in the second lens device; reading a coordinate initial value as a longitudinal value $(X1_0)$ and a transverse value $(Y1_0)$ through an indicator attached to the micro-alignment telescope in a state that the optical axis is aligned; reading a coordinate change value as a longitudinal displacement $(X1_1)$ and a transverse displacement $(Y1_1)$ through the indicator on the sighting target as the vacuum chamber maintained in a high vacuum state reaches a targeted high vacuum state when the accelerating tube to which the sighting target is attached is placed inside the vacuum chamber; and calculating a first correcting value based on the coordinate initial value and the coordinate change value.

Details of other embodiments are included in the detailed description and accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

The same reference numerals denote the same elements throughout the specification, and sizes, positions, and coupling relationships of the elements may be exaggerated for clarity. Detailed descriptions of well-known functions and structures incorporated herein may be omitted when they make the subject matter rather unclear.

According to the present invention, the micro alignment telescope of a non-contact optical type is operated in high vacuum, so that the problems of a previous contact measurement type may be solved. In addition, the position of the accelerating tube installed in the vacuum chamber is precisely measured and corrected so that the performance of the accelerating tube may be improved.

In addition, the position of an important component deformed according to a degree of vacuum in the vacuum chamber may be precisely measured such that position of an important component is corrected.

In addition, even in cases when the inner temperature of the vacuum chamber is high, precise measurement may be performed. Even in cases when harmful gas fills the vacuum chamber, precise measurement may be performed.

BRIEF DESCRIPTION OF THE DRAWINGS

FIG. 1 is a perspective view showing a system for measuring displacement of an accelerating tube in a high-vacuum chamber according to an embodiment of the present invention.

FIG. 2 is a plan view of the system depicted in FIG. 1.

FIG. 3 is an enlarged view showing one example of a sighting target which is a component of the system for measuring displacement of an accelerating tube according to an embodiment of the present invention.

FIG. 4 is a perspective view showing one example of a micro-alignment telescope of the system for measuring displacement of an accelerating tube according to an embodiment of the present invention.

DETAILED DESCRIPTION OF THE INVENTION

The terminology and words used herein and accompanying claims should be not interpreted as the meanings of commonly used dictionaries, but interpreted as having meanings according to the technical sprit of the present invention on the principle that the concepts of the terminology and the words can be defined by the inventor in order to explain the present invention in the best mode.

Throughout the whole specification, when a predetermined part "includes" a predetermined component, the predetermined part does not exclude other components, but may further include other components unless the context clearly indicates otherwise. In addition, the terms "part", "machine", "module", "device", or "step" refer to units to process at least one function or operation, and is realized. by hardware or software, or the combination of the hardware and the software.

Hereinafter, a system for measuring displacement of an accelerating tube in a high-vacuum chamber by using a micro-alignment telescope and a method thereof according to an exemplary embodiment of the present invention will be described in detail with reference to accompanying drawings.

FIG. 1 is a perspective view showing a system for measuring displacement of an accelerating tube in a high-vacuum chamber according to an embodiment of the present invention, and FIG. 2 is a plan view of the system of FIG. 1.

Referring to FIGS. 1 and 2, a system of measuring displacement of an accelerating tube includes a vacuum chamber 100 in which a vacuum is formed, a hollow accelerating tube 200 placed in the vacuum chamber 100, first and second viewports 110 and 120 placed in the vacuum chamber 100, a micro-alignment telescope 300 capable of precisely aligning an object, first and second lens devices 410 and 420 each having a lens and supporting the lens, and a sighting target 210 attached to a side surface of the accelerating tube 200 while protruding from the side surface.

In this case, the micro-alignment telescope 300 is preferably spaced apart from one side surface of the vacuum chamber 100 by a predetermined distance, and the first lens device 410 is preferably interposed between the micro-alignment telescope 300 and the vacuum chamber 100. In addition, the second lens device 420 is preferably spaced apart from the opposite surface of the vacuum chamber 100 by a predetermined distance.

By having the components displaced in this way, the micro-alignment telescope 300, the first lens device 410, the first viewport 110, the sighting target 210, the second viewport 120 and the second lens device 420 all may be aligned along an optical axis formed by a light source 421 provided to the second lens device 420. Preferably, the devices are aligned on the same axis in one direction. To align them more precisely, the first lens device 410 preferably includes an inclination controller 411 able to control an inclination of the first lens device 410. In addition, the first and second viewports 110 and 120 are preferably formed of glass.

As shown in FIGS. 1 and 2, the micro-alignment telescope 300 may be displaced as a pair of micro-alignment telescopes 300*a* and 300*b*. The first lens device 410 may be displaced as a pair of first lens devices 410*a* and 410*b*. The first viewport 110 may be displaced as a pair of first viewports 110*a* and 110*b*. The sighting target 210 may be displaced as a pair of sighting targets 210*a* and 210*b*. The second viewport 120 may be displaced as a pair of second. viewports 120*a* and 120*b*. The second lens device 420 may be displaced as a pair of second lens devices 420*a* and 420*b*.

The micro-alignment telescope 300*a*, the first lens device 410*a*, the first viewport 110*a*, the sighting target 210*a*, the second viewport 120*a*, and the second lens device 420*a* are preferably aligned on the optical axis A. In addition, the micro-alignment telescope 300*b*, the first lens device 410*b*, the first viewport 110*b*, the sighting target 210*b*, the second viewport 120*b*, and the second lens device 420*b* are preferably aligned on the optical axis B. In this case, the optical axes A and B are preferably parallel to each other.

Specifically, the pair of the sighting targets 210*a* and 210*b*, which protrude from both sides of the accelerating tube 200, are used as references which represent a degree of deformation when the accelerating tube 200 and the vacuum chamber 100 are deformed after the optical axes A and B are aligned.

The sighting targets 210a and 210b may be formed of transparent material, but the material and shape of the sighting targets 210a and 210b are not limited to specific kind and shape. In addition, the sighting targets 210a and 210b are preferably attached to the accelerating tube 200 with bolts to protrude perpendicularly to the outer surface of the accelerating tube 200. Specifically, the direction of an ion beam, which is formed when a heavy-ion accelerator is operated, is preferably perpendicular to the direction of the sighting targets 210a and 210b protruding from the accelerating tube 200.

FIG. 3 is an enlarged view showing one example of the sighting target 210 according to an embodiment of the present invention. Referring to FIG. 3, a display part 211 is formed on the sighting target 210. The display part 211 preferably, includes a plurality of concentric circles having mutually different sizes which are usable as references of coordinates, but is not limited to a specific shape or pattern.

FIG. 4 is a perspective view showing one example of the micro-alignment telescope 300 of the system for measuring displacement of an accelerating tube according to an embodiment of the present invention. Referring to FIG. 4, the micro-alignment telescope 300 includes an eyepiece part 310 provided on one end thereof, an adjustment part 320 for precisely adjusting the focus and alignment, and radiation part 330 provided on another end thereof. In addition, the micro-alignment telescope 300 which may be used for the system is not limited to one kind thereof.

Hereinafter, a method of measuring displacement of an accelerating tube by using a micro-alignment telescope according to the present invention will be described.

After the micro-alignment telescope 300 is adjusted to be levelled with a ground in step (a), the micro-alignment telescope 300, the first and second lens devices 410 and 420, the sighting target 210 and the first and second viewports 110 and 120 are aligned in a row based on the optical axis formed by the light source 421 included in the second lens device 420 in step (b).

Preferably, the steps (a) and (b) are commonly applied to devices aligned as pairs along two optical axes A and B, respectively.

In step (c), an indicator (not shown) attached to the micro-alignment telescope 300a may read a coordinate initial value as a longitudinal value $X1_0$ and a transverse value $Y1_0$ in the state that the optical axis A is aligned. The step (c) may include step (c1) in which an indicator (not shown) attached to the micro-alignment telescope 300b may read another coordinate initial value as a longitudinal value $X2_0$ and a transverse value $Y2_0$ in the state that the optical axis B is aligned.

In step (d), the vacuum pressure of the accelerating tube 200 to which the sighting target 210a is attached is maintained in a high vacuum state in a state where it is located inside the vacuum chamber 100, and when a targeted vacuum pressure state is reached, the indicator provided to the micro-alignment telescope 300a may read a coordinate change value as a longitudinal displacement $X1_1$ and a transverse displacement $Y1_1$ in units of micrometers.

The step (d) may include step (d1) in which, similarly to the step (d), the indicator which is provided to the micro-alignment telescope 300b may read another coordinate change value as a longitudinal displacement $X2_1$ and a transverse displacement $Y2_1$ in units of micrometers.

In step (e), a first correcting value is calculated based on the coordinate initial value $X1_0$ and $Y1_0$ and the coordinate change value $X1_1$ and $Y1_1$ obtained in steps (c) and (d).

The step (e) may include step (e1) in which, similarly to the step (e), a second correcting value is calculated based on another coordinate initial value $X2_0$ and $Y2_0$ and another coordinate change value $X2_1$ and $Y2_1$ obtained through the micro-alignment telescope 300b.

Preferably, the first and second correcting values are differential values between the coordinate initial values and the coordinate change values obtained through the micro-alignment telescopes 300a and 300b, respectively. That is, the first correcting value may be expressed as $\Delta X1 = X1_0 - X1_1$ and $\Delta Y1 = Y1_0 - Y1_1$ and the second correcting value may be expressed as $\Delta X2 = X2_0 - X2_1$ and $\Delta Y2 = Y2_0 - Y2_1$.

When the first and second correcting values are calculated, the vacuum chamber 100 and the accelerating tube 200 may be aligned by using the first and second correcting values, so that the accelerating tube 200 may be disposed at the correct position thereof. Thus, differently from a previous measuring method, the displacement of the accelerating tube 200 may be precisely measured in a non-contact manner by using the correcting value calculated by the simple process described above without making direct contact with the accelerating tube 200 in the hollow chamber 100.

Furthermore, in case the accelerating tube 200 is moved away from the correct position due to additionally supplying a refrigerant or heat source into the vacuum chamber 100 or applying a thermal or chemical variation in a vacuum state, the displacement may be precisely measured according to the present invention.

When the refrigerant and the heat source are supplied into the vacuum chamber, in step (f), the micro-alignment telescopes 300a and 300b, the first lens devices 410a and 410b, the first viewports 110a and 110b, the sighting targets 21-a and 210b, the second viewports 120a and 120b, and the second lens devices 420a and 420b are aligned in two rows along the pair of the optical axes A and B formed by the light sources provided in the second lens devices 420a and 420b.

In step (g), the indicators attached to the micro-alignment telescopes 300a and 300b read the coordinates of the pair of the optical axes A and B. The vertical movement and the horizontal movement which occur about the optical axis A may be expressed as $X1_2$ and $X2_2$, and the vertical movement and the horizontal movement which occur about the optical axis B may be expressed as $X2_2$ and $X2_2$.

In step (h), a correcting value is calculated based on the coordinate values $X1_2, X2_2, Y1_2$ and $Y2_2$ obtained in step (g) and the initial values $X1_0, X2_0, Y1_0$ and $Y2_0$ obtained in step (c).

In step (i), the correcting value calculated in step (h) is used to align the vacuum chamber 100 and the accelerating tube 200, so that the accelerating tube (200) is disposed at the correct position thereof again.

In this case, the correcting value calculated in step (h) is preferably calculated based on the subtraction between the coordinate values obtained in step (g) and the coordinate values obtained in (c). That is, the correcting value, which is calculated when the refrigerant and the heat source are supplied into the vacuum chamber 100, may be expressed as $\Delta X2 = X2_0 - X2_1$ and $\Delta Y2 = Y2_0 - Y2_1$.

Although a preferred embodiment of the present invention has been described for illustrative purposes, those skilled in the art will appreciate that various equivalents, modifications, additions and substitutions are possible, without departing from the scope and spirit of the invention as disclosed in the accompanying claims.

What is claimed is:

1. A system of measuring displacement of an accelerating tube by using a micro-alignment telescope, the system comprising:
   a vacuum chamber inside which a vacuum state can be formed;
   a hollow accelerating tube placed in the vacuum chamber;
   a sighting target attached to a surface of the accelerating tube while protruding from the surface of the accelerating tube;
   the micro-alignment telescope spaced apart from one side surface of the vacuum chamber by a predetermined distance;
   a first lens device interposed between the micro-alignment telescope and the vacuum chamber; and
   a second lens device spaced apart from an opposite side surface of the vacuum chamber by a predetermined distance,
   wherein the vacuum chamber includes first and second viewports placed on the one side surface and the opposite surface of the vacuum chamber in correspondence with each other, and
   the micro-alignment telescope, the first lens device, the first viewport the sighting target, the second viewport and the second lens device are aligned on a same axis in one direction.

2. The system of claim 1, wherein each of the micro-alignment telescope, the first lens device, the first viewport, the sighting target, the second viewport and the second lens device is provided as a pair aligned about two axes, and
   the pair of sighting targets protrudes from both sides of the accelerating tube.

3. The system of claim 1, wherein the second lens device comprises a light source.

4. The system of claim 1, wherein the first lens device comprises an inclination controller.

5. The system of claim 3, wherein the light source forms one optical axis, and
   the micro-alignment telescope, the first lens device, the first viewport, the sighting target, the second viewport and the second lens device are aligned about the optical axis.

* * * * *